No. 843,481. PATENTED FEB. 5, 1907.
W. McCOOK.
AUTOMATIC AIR BRAKE MECHANISM.
APPLICATION FILED OCT. 16, 1905.
2 SHEETS—SHEET 2.
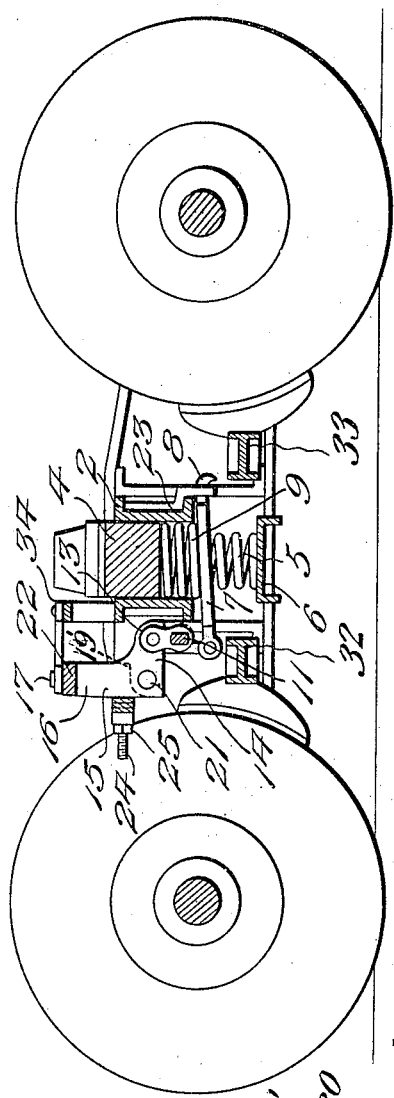
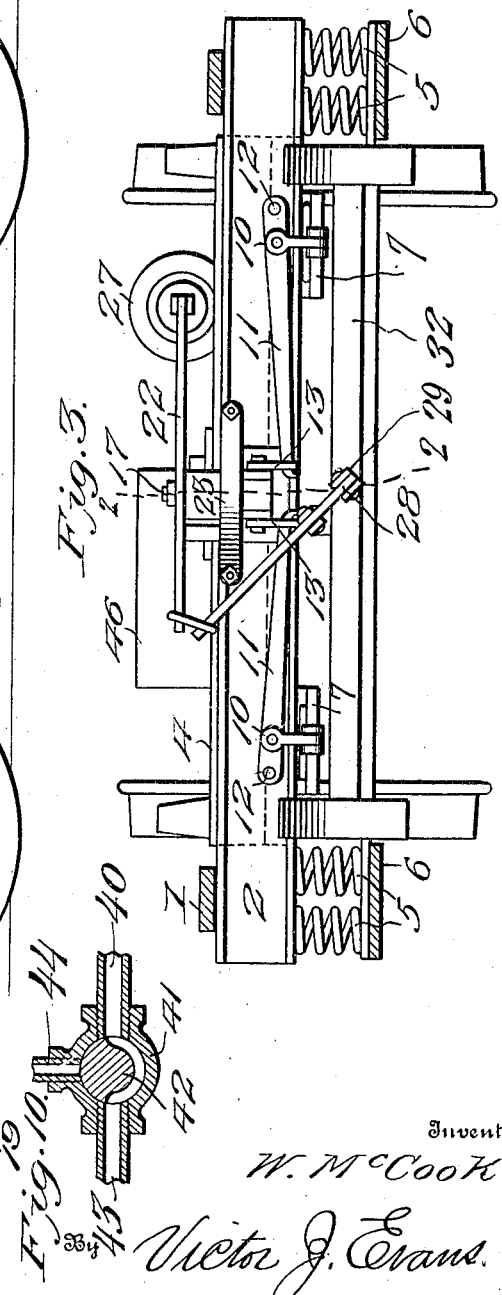
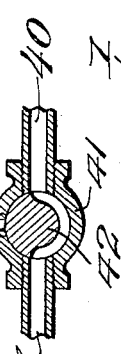
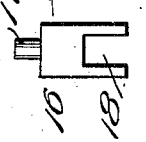
Witnesses
E. G. McKee
C. C. Hiller
Inventor
W. McCook
By Victor J. Evans
Attorney

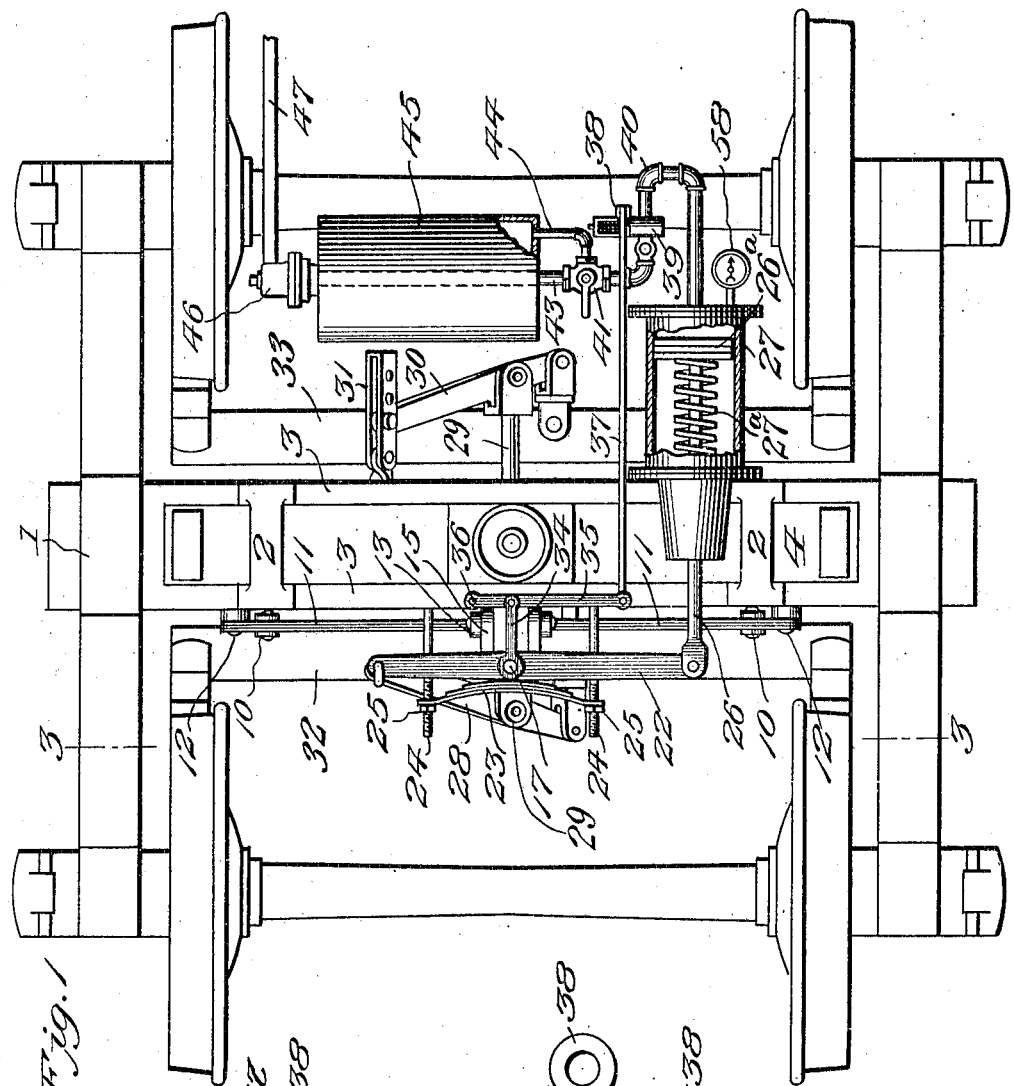

UNITED STATES PATENT OFFICE.

WILLIAM McCOOK, OF WALTON, NEW YORK.

AUTOMATIC AIR-BRAKE MECHANISM.

No. 843,481.          Specification of Letters Patent.          Patented Feb. 5, 1907.

Application filed October 16, 1905. Serial No. 282,955.

*To all whom it may concern:*

Be it known that I, WILLIAM McCOOK, a citizen of the United States of America, residing at Walton, in the county of Delaware and State of New York, have invented new and useful Improvements in Automatic Air-Brake Mechanism, of which the following is a specification.

This invention relates to certain new and useful improvements in automatic air-brakes for railway-cars.

The main object of the invention is the production of a simple and effective brake mechanism which will automatically adjust itself to brake light or heavy and proportionately to the weight of the load, and which will also apply the brakes to the wheels of each truck of a car according to the respective weights of the ends of the car or sections of the load borne by the train, so as to enable a mixed train of light cars and loaded cars to be properly braked and to secure a graduated application of the brakes to the truck-wheels of each car according to the respective weights sustained thereby, thus permitting trains to be perfectly controlled and skidding of wheels and buckling of the cars of a train to be prevented.

Another object of the invention is to provide a construction of brake mechanism whereby the weight of the load carried by the car may be readily determined without the use of track-scales and whereby the brake mechanism may be regulated to secure the desired maximum balancing cylinder-pressure of an empty car of any given weight.

Still another object of the invention is to provide means for automatically relieving the brake-cylinder of excess pressure and for independently controlling the sets of braking devices to compensate for leakage in testing the brakes.

The invention further contemplates the provision of a brake mechanism which will operate in conjunction with systems now in common use and which will enable a higher degree of braking power to be obtained to control heavy trains and trains descending heavy grades.

With the above and other objects in view the invention consists of the novel construction and combination of parts hereinafter fully described and claimed, reference being had to the accompanying drawings, in which—

Figure 1 is a top plan view of a car-truck equipped with my improved brake mechanism. Fig. 2 is a longitudinal section on the line 2 2 of Fig. 3. Fig. 3 is a transverse section on the line 3 3 of Fig. 1. Fig. 4 is a vertical section through the cut-off or pressure-regulating valve. Fig. 5 is a horizontal section thereof, showing the valve in open position. Figs. 6 and 7 are fragmentary sections similar to Fig. 4, showing the pressure-valve in its closed and exhaust positions. Figs. 8 and 9 are detail views of the bell-crank lever and its supporting bracket. Fig. 10 is a section through the test-valve.

Referring now more particularly to the drawings, the numeral 1 designates a car-truck of the well-known diamond type, but which may be of any other preferred type and which carries a compound bolster comprising a stationary bolster 2, formed of spaced parallel beams or members 3, properly tied together and fastened to the truck-frame, and a movable bolster 4, which is held and guided between the beams 3 and bears upon cushioning-springs 5, supported upon the ends of a spring-plank 6, attached to the truck-frame below the bolsters. The movable bolster 4 is pivotally secured in the ordinary or any preferred manner to the adjacent end portion of the car arranged above the truck and supports the weight thereof (or the weight of one-half of the car) and the weight of the load carried thereby. For convenience of description and statement of the function of the bolster member 4 the combined weights mentioned will be broadly termed the "load," and the bolster 4 the "load-supporting member."

Extending transversely of and beneath each end of the bolster 4 is a load-sustaining lever 7 of the third class, which is pivotally connected at one end to the truck-frame, as indicated at 8, and between which and the movable bolster is interposed a coiled cushioning-spring 9. The opposite ends of the two levers 7 are connected by links 10 with a pair of balancing or load-transmitting levers 11 of the third class extending longitudinally across the truck and parallel with the compound bolster. The outer ends of the levers 11 are pivoted adjacent to and beyond the links 10 to the contiguous side of the stationary bolster, as indicated at 12, while the inner ends thereof are connected by links 13 with the inwardly-extending horizontal arm 14 of an elbow or bell-crank lever 15, the vertical arm 16 of which carries a vertical pivot-stud 17. The horizontal arm 14 of the said lever is slotted or bifurcated, as shown at 18, to receive a supporting lug or boss 19 on a bracket 20, secured to the adjacent stationary bolster-beam 3, and is fulcrumed at the angle of intersection of its arms to the lug by a pivot-pin 21 to adapt the lever to have a rocking or swinging movement. The boss 19 has a stop-shoulder 19', against which the inner edge of the vertical arm bears when said arm is in its normal vertical position and which limits the backward or inward movement of said arm or its movement toward the bolster.

A cylinder or power-lever 22 of the first class is fulcrumed to swing in a horizontal plane upon the stud 17 and normally extends parallel with the bolsters, which position it occupies when the brake-shoes are fully retracted. The central portion of a bowed balancing-spring 23 bears against the outer side of the arm 16 of the bell-crank lever 15 below said lever 22 and above the pivot connection 21, and the ends of said spring are apertured for the reception and passage of the outer threaded ends of fixed supporting-rods 24, projecting from the stationary bolster. Nuts 25 engage the threaded ends of the rods and bear upon the ends of the spring, whereby the pressure of the spring on the bell-crank lever may be regulated.

The lever 22 is connected at one end with the rod 26 of a spring-actuated piston 26$^a$, operating in a brake-cylinder 27, which piston is urged to release position upon the reduction of pressure in said cylinder by the usual release-spring 27$^a$. The other end of the lever 22 is connected to the live-truck lever 28, attached in the usual manner by the bottom coupling rod or bar 29 to the dead-truck lever 30, adjustably fulcrumed at 31 to the stationary bolster, the two levers 28 and 30 being intermediately pivoted to the brake-beams 32 and 33. When the upper end of the lever 28 is swung toward or from the bolster, the brake-beams will be moved to apply or release the brake-shoes.

A link 34 is pivotally connected at one end to the stud 17 and at its opposite end to a lever 35, pivoted at one end, as indicated at 36, to the stationary bolster and connected at its opposite end by means of a link-rod 37 with the actuating-crank 38 of a pressure-regulating valve 39. The valve 39 is arranged in an air-supply pipe 40, communicating at one end with the brake-cylinder and connected at its opposite end by a three-way-valve casing 41, in which is a two-way test-valve 42 with pipes 43 and 44. The pipe 43 is disposed in line with the inlet end of the pipe 40 and extends through an auxiliary reservoir 45 and communicates therewith through the triple valve 46, while the pipe 44, which opens into the casing 41 at right angles to said pipes 40 and 43, is in direct communication with the auxiliary reservoir. The parts referred to are suitably supported upon the truck, and the triple valve connects in the usual manner with its train-pipe 47.

The valve 42 has three operative positions, in one of which it closes communication between all three pipes 40, 43, and 44. In its second position the valve opens communication between the pipes 40 and 43 and closes communication between the pipes 40 and 44, as shown in Fig. 10. In its third position the valve opens communication between the pipes 40 and 44 and closes communication between the pipes 40 and 43. Thus the said pipe connections between the auxiliary reservoir and brake-cylinder may be manually controlled to establish communication between the cylinder and reservoir indirectly through the triple valve for service use and to connect the cylinder directly with the reservoir for leakage and load-weighing tests, as hereinafter described.

The "pressure-regulating" valve 39, so called because it is automatically closed to cut off the feed of air to the brake-cylinder when the pressure in said cylinder reaches the maximum pressure-point, comprises a casing 48, having an air-feed passage 49 and threaded ends 50 and 51 for respective connection with couplings joining it to the valve-casing 41 and pipe 40. Intermediate the said threaded terminals 50 and 51 the casing is formed with a vertical bore 52, intersecting said feed-passage and open at its lower end. In said bore is fitted a rotary plug-valve 53, having a port 54 to register with the passage 49 and also having in its side an exhaust-groove 55, adapted in one position of said valve to communicate with said passage and permit excess pressure in the brake-cylinder to exhaust to the atmosphere. A by-pass 56 connects the terminals of the passage 49, and adjacent the point of connection of said passage with the inlet terminal 50 is formed with a seat for a check-valve 57, normally held closed by the excess air-pressure on the auxiliary-reservoir side to prevent the flow of air through said by-pass. The stem of the valve crosses the feed-passage 49, but is restricted in size so as to allow air to freely flow through said passage at all times when the valve 53 is open and the check-valve 57 is closed. A spring 53', attached to the valve-casing and stem of the valve 53, to which latter the crank 38 is also attached, holds said valve in its seat.

Attached to the brake-cylinder is a gage 58, by which the pressure of the air stored therein may be determined and by which also leaks may be detected and the weight of the load carried by the car may be calculated, as hereinafter described. This gage may be a permanent fixture or temporary attachment, as may be desired.

The structure of the parts having been described, I will now proceed to explain the principle and mode of operation, it being understood that I do not limit the invention to the means herein set forth for carrying the invention into practical effect, as many changes may be made without departing from the spirit of the invention.

Preliminary to the description of the operation it may be stated that each truck of a car will be equipped with a brake mechanism of the construction described or its equivalent, and it will be observed that all the parts of the apparatus, which includes the essential elements of an air-brake apparatus—to wit, a brake-cylinder, an auxiliary reservoir, and a controlling or triple valve and proper operative connections between them—are mounted upon the frame and stationary bolster of the truck and that consequently the brakes of each truck of a car and of all the trucks of the cars of a train are self-controlling, and, as hereinafter described, independently apply the braking power according to the weight of the truck and that of the load supported thereby, so that the braking pressure applied to each set of wheels will be sufficient to overcome the resistance to the stoppage of the same and no more, as the pressure will vary according to the respective resistances. In other words, the pressures will vary accordingly as the loads are light or heavy at different ends of a car and along the entire length of a train, thus preventing excess pressure on the wheels of an empty or lightly-laden car and too light a pressure upon the wheels of a heavy or heavily-laden car.

It is well known that all ordinary existing automatic brake systems are inadequate to brake more than seventy per cent. of the weight of an empty car alone, at least in freight-brake equipment, and have no brake power on the load or any capability of adjusting the braking power to different loads, and also that suggested systems designed to vary the braking power according to the weight of the load do not contemplate the use of any means to compensate or allow for the weight of the trucks as an item in the resistance necessary to be overcome in order to secure a light and heavy graduated braking pressure. My invention is designed to overcome these several difficulties and to adapt heavily or lightly laden cars or trains to be controlled with safety when running at high speed or down grades.

It will be apparent that the weight of the portion of the car and its load, if any, supported by the truck will be sustained by the movable bolster 4 and will be transmitted thereby through the load-sustaining and transmitting levers 9 and 11 to the horizontal arm 14 of the bell-crank lever 15 and constitutes a unit of resistance to the movement of said bell-crank lever. The pressure of the spring 23 also opposes a unit of resistance to the movement of the lever 15, which unit measures the assumed resistance of the weight of the truck and parts carried thereby to braking pressure or of the weight of the truck and parts without the weight of the load or unit resting on the movable bolster—namely, without the weight of the supported portion of the car. These two units of resistance measure the weight of the total moving load to be brought to a state of rest by the action of the brake-shoes on the wheels carried by each truck. The lever 15 will thus be held from movement by a resistance corresponding to the total weight of the load and truck, and in such position of the lever the valve 53 will be held fully open to allow air from the auxiliary reservoir to feed unrestrictedly through the triple valve and pipe 40 to the brake-cylinder, it being understood that the valve 42 normally stands in the position shown in Fig. 10 to allow air to flow between pipes 40 and 43 and to cut off communication between said pipes and the pipe 44. In the normal operation of the brake system air may therefore flow into the brake-cylinder until the maximum working pressure is reached, and the brake-piston may have the usual play in said cylinder up to the time such pressure is reached without affecting the lever 15, as the lever 22 will have free independent swinging movement on its fulcrum 17. When, however, the maximum braking pressure in the brake-cylinder is reached and the piston has been forced forward to the limit of its thrust-stroke and the lever 22 has been swung to applying position and the brake-shoes have thereby been thrown into engagement with the wheels, the pressure behind the piston will balance the total load or combined resistances referred to, and any further movement of the piston will overcome such resistances and cause the lever 15 to tilt, and thereby close the valve 39 to cut off the feed of any more air to the brake-cylinder, so that exactly the amount of braking pressure to overcome the weight of the load, and no more, will be applied to the wheels. When the valve 39 is open, the brake mechanism may be controlled by the engineer in the usual way through the engineer's brake-valve and the triple valve; but when the above-described phase of operation is reached the supply of further pressure of air to the brake-cylinder until after the brakes are released will be prevented, as the valve 39 will remain closed. To release the brakes, the triple valve is moved to release position in the usual way by an increase of pressure in the train-pipe, and when this occurs the excess pressure on the brake-cylinder side of the check-valve 57 will force said valve open and air will exhaust from the brake-cylinder to the atmosphere through the by-pass 56 and exhaust-port of the triple valve, thus permitting the release-spring to force the brake-piston to release position. The weight of the load transmitted through the movable bolster 4 and the pressure of the spring 23 will thereupon restore the lever 15 to normal position, and the valve 39 will be opened to again permit air to flow to the brake-cylinder. If when the brakes are applied under the normal maximum braking pressure there should be any further augmentation of pressure in the brake-cylinder due to leakage of air past the valves 39 and 57, relief will be afforded, as the consequent slight further forward movement of the piston will cause the lever 15 to be tilted to a greater extent, whereby the valve member 53 will be moved from the position shown in Fig. 6 to the position shown in Fig. 7, thus allowing the excess pressure to vent to the atmosphere through the groove 55. Excess pressure of the brake-shoes on the wheels therefore cannot possibly occur.

As an example of the qualifications of the brake mechanism, we will assume that with a pressure of seventy pounds in the train-line the maximum pressure in the brake-cylinder is set at fifty pounds, which with an eight-inch cylinder will yield two thousand five hundred pounds braking power. Now let us also suppose that the weight of an unloaded eighty-five-thousand-pound-capacity car resting on its two trucks is forty-four thousand pounds, the body weighing twenty-four thousand pounds and each truck with its equipment ten thousand pounds, so that one-half of the weight of the body, or twelve thousand pounds, is supported by the movable bolster 4 of each truck, and, further, that the ratio of the cylinder-lever 22 is one and one-half to one, or that its cylinder end is half as long again as its power-transmitting end. Now one-half of the cylinder power, or twelve hundred and fifty pounds, is designed to be used to fully apply the brakes on the wheels of each truck of an empty car of this capacity, and if we multiply this effective power by the increased lever ratio, (or 1250 × 1.5,) it will be apparent that the lever will have an effective brake-applying power of eighteen hundred and seventy-five pounds. The mechanism may be adapted to brake the car at a uniform ascending scale from empty to maximum load; but the truck-levers are preferably adjusted to brake full at seventy per cent. of the weight of the empty car at a brake-cylinder pressure of twenty-five pounds since in braking on an ascending scale the car would be braked at its maximum at a little above seventeen pounds cylinder-pressure, which would render the brake too quick in action, so that it follows that seventy per cent. of twenty-two thousand equals fifteen thousand four hundred pounds, the light-weight braking power required for each end of the car, and 15,400 ÷ 2 = 7,700 pounds, the individual brake-beam force required. Now the force of seven thousand seven hundred pounds, or brake-beam force, must be divided by the force of eighteen hundred and seventy-five pounds delivered by the cylinder-lever to get the ratio of truck-levers, so 7,700 ÷ 1,875 = 4,106 + equals the ratio of truck-levers. As the cylinder with twenty-five-pounds gage pressure has a power of twelve hundred and fifty pounds and delivers a force of eighteen hundred and seventy-five pounds at the opposite end of its lever, and as the fulcrum is between these points it follows that there is a force of 1,250 + 1,875 pounds = 3,125 pounds on the fulcrum. Thus we will use only one-half of the maximum cylinder-pressure to brake seventy per cent. of the weight of each half of the car when empty, leaving a cylinder-pressure of twenty-five pounds to brake the load carried by such portion of the car, and as this pressure also yields an additional cylinder-lever fulcrum force of three thousand one hundred and twenty-five pounds this force will be used to balance the load-weight—namely, forty-two thousand five hundred pounds. As the weight of the load is, as stated, forty-two thousand five hundred pounds, it will be apparent that such a resisting force or pressure will be transmitted by the levers 11 to the lever 15 to hold the latter from movement. Now as the fulcrum force exerted on the lever 15 by the second twenty-five-pound cylinder-pressure is three thousand one hundred and twenty-five pounds, in order to make this fulcrum force sufficient to balance the weight of the load the ratio of the levers 11 should be 6.8 to 1. This follows from the fact that as the weight of each lever 11 sustains a weight of ten thousand six hundred and twenty-five pounds (one-fourth of the weight of the load) and is subjected to one-half of the opposing fulcrum force, (or fifteen thousand six hundred and twenty-five pounds,) 10,625 ÷ 1,562.5 will give 6.8, the required ratio. Now in these calculations we have shown that we have on one hand with the initial cylinder-pressure of twenty-five pounds a fulcrum power of three thousand one hundred and twenty-five to balance a load of twelve thousand pounds, to wit: The weight of the supported end of the empty car plus the weight of the bolster and levers, amounting in all to, say, thirteen thousand pounds, and that we have, on the other hand, with the secondary twenty-five-pound cylinder-pressure an added fulcrum power of three thousand one hundred and twenty-five pounds to balance a load of forty-two thousand five hundred, and hence that as the fulcrum power on the rocking lever 15 at fifty pounds-cylinder-pressure will be seven thousand two hundred and fifty pounds an equivalent balancing resistance to the movement of said lever under such pressure should be established. We have shown that the weight of the load will yield its proportion of the necessary resistance; but as the remainder cannot be fully established by the weight of the supported half of the car and movable bolster and as the weight of the truck cannot be brought into service for this purpose some compensating means to supplement the weight of the supported half of the car and bolster to represent the weight resistance of the truck to the braking action must be employed. This is attained by the use of the spring, whose pressure will supply the required additional resistance and such resistance as is necessary to represent also speed or momentum resistance, if desired. The pressure of this spring is regulated through the nuts 25, so that a resistance to the movement of the lever 15 will be established, which will be balanced when the car is empty by the fulcrum pressure on said lever when the pressure in the cylinder reaches twenty-five pounds. Hence whether light or loaded the weight of the mass to be braked will be balanced and the exact amount of brake-pressure to control the movement thereof brought into play. This follows from the fact that the resisting forces to the movement of the lever 15 are overcome and the lever operated to close the regulating-valve 39 when the established maximum braking pressure for the particular weight to be controlled is reached.

It will of course be understood that as one of the aforesaid resistances, which may be termed an "equipment-resistance," is fixed, as it is established through the weight of the car and truck, while the other or "load-resistance" varies from time to time upon different cars and frequently upon the ends of a car each set of brake mechanism is self-controlling and may exert a braking pressure independent of and varying from its companion set on the same car and from the sets of brake devices on other cars of a train, so that each brake mechanism will apply a braking pressure commensurate with the weight of the particular total load which it controls. Thus if one end of a car is empty or lightly laden and the other end is heavily loaded the brakes of the two trucks will exert different commensurate pressures, while if a train is made up of empty or lightly and heavily laden cars, the braking-pressures throughout the length of the train will be regulated accordingly, thereby enabling the train to be perfectly controlled and skidding or buckling of the cars prevented.

It is calculated that a brake constructed in accordance with my invention will give 47.75 per cent. of the weight of car and load for braking, which is from ten to fifteen per cent. greater than is afforded with the high-pressure-controlled brake, which latter must operate with loaded cars, whereas with my brake every alternate car can be light and loaded, and the brake will act accordingly. It is also calculated that the braking power will be at least twice as great with a maximum load than existing brake systems, insuring greater safety on descending grades.

It will be observed that the brake mechanism is self-sustained on the truck, so that it will adjust itself to curves and inequalities equally well with the brakes applied or released, thus lessening the danger of derailment and buckling by a sudden application of the brakes. Each truck brakes separately, and therefore it will be seen that if the brake upon one truck is disabled the brake on the other truck will hold as well as an old-style brake and if one end of the car is empty and the other loaded each end will brake accordingly. It will be further seen that as the cylinder-pressure cannot be increased above the safety limit, no matter how high the auxiliary-reservoir pressure or how short the range of travel of the piston-rod, flattening of the car-wheels produced by over pressure in existing brake systems cannot possibly occur.

It will be understood, of course, that the spring 23 may be of any form and arrangement to serve the purpose and that any other suitable resisting medium may be substituted therefor.

By means of the gage 58 the weight of the load on the car may be readily determined. Assuming that the spring 23 is properly adjusted, so that when the brakes are applied on the car when empty the gage 58 will show a pressure of twenty-five pounds in the brake-cylinder, it will be apparent that after the car is loaded an increase of pressure above twenty-five pounds, varying according to the weight of the load, must be employed to apply the brakes. This being understood, the operation of weighing the load sustained by each truck is accomplished by applying the brakes, and as the gage will show the resulting pressure the approximate weight of the load may be easily calculated by allowing a certain number of pounds, the scale-braking pressures for different weights of loads being known for each pound of cylinder-pressure above twenty-five pounds. The weight of the total load is of course obtained by consulting the gages on both trucks. Friction and release spring resistance may be left out of the calculation, as the load weight may be closely enough estimated for all practical purposes. This feature of the invention will be found of value where track-scales are not available. The higher pressure will of course represent the load-balancing pressure, and as the valve 39 will close before this pressure can be materially exceeded if the brakes are applied through the action of the triple-valve a greater reliability of accurate calculation is insured. It will of course be understood that by turning the valve 41 to cut off communication between the brake-cylinder and the auxiliary reservoir and to connect the cylinder and reservoir through the pipe 44 the brakes of any individual truck may be independently applied directly by reservoir-pressure and that when this is done the pressure in the brake cannot materially vary from the maximum braking pressure, fifty pounds, as, owing to the fact that the pressure in the reservoir is maintained at seventy pounds the pressures will always balance. This will allow the load supported by any truck to be weighed without applying the brakes on the other truck or trucks, and as the pressure in the brake-cylinder cannot fluctuate the gage will show the correct load-balancing pressure, from which the weight of the load can be readily deduced. The gage is also used as a means by which tests may be made at desired times to determine whether or not there is any leakage of air from the brake-cylinder or past the brake-piston. This is accomplished by applying the brakes and allowing them to remain set for a period. The maximum braking pressure being known, any diminution of pressure shown by the gage will indicate a leak or faulty adjustment of the spring 23.

In testing the brake devices upon the trucks of the cars of a train it will be understood that as leakage cannot be entirely avoided the pressures in the cylinders of the rear cars would be liable to be decreased by the extent of leakage allowed before the inspector or tester reached them, as he successively passed from car to car in making the tests and that consequently the pressures at the time of application of the brakes would be incorrectly indicated by the gages. To overcome this difficulty, the two-way valves 42 on all the brake devices are turned to close communication between the pipe 40 and the pipe 43 leading to the triple valve and to open communication between the pipe 40 and the pipe 44 leading to the auxiliary reservoir. This will permit air to flow from the auxiliary reservoir to the brake-cylinder to compensate for the loss of air, if any, from the brake-cylinder from leakage.

Having thus described the invention, what is claimed as new is—

1. In an automatic air-brake system, means controlled by variations in the brake-cylinder pressure whereby the weight of the load on a car may be determined.

2. In an automatic air-brake mechanism, a truck carrying a movable car-supporting bolster, brake mechanism supported by the truck, a cut-off valve between the auxiliary reservoir and brake-cylinder of said mechanism, a bell-crank lever fulcrumed upon the truck, lever connections between said bolster and horizontal arm of the bell-crank lever to transmit the resistance of the weight of the load to the movement of said lever, a spring bearing on the vertical arm of the bell-crank lever and opposing an added resistance to the movement thereof, a cylinder-lever fulcrumed to the vertical arm of the bell-crank, and means for communicating motion to close the cut-off valve when the fulcrum pressure of the cylinder-lever in the bell-crank lever overcomes the resistances and causes the bell-crank lever to tilt.

3. In an automatic air-brake mechanism, a truck carrying a movable car-supporting bolster, brake mechanism supported by the truck, a cut-off valve between the auxiliary reservoir and brake-cylinder of said mechanism, a bell-crank lever fulcrumed upon the truck, lever connections between said bolster and horizontal arm of the bell-crank lever to transmit the resistance of the weight of the load to the movement of said lever, a spring bearing on the vertical arm of the bell-crank lever and opposing an added resistance to the movement thereof, means for adjusting the spring to vary the pressure thereof, a cylinder-lever fulcrumed to the vertical arm of the bell-crank, and means for communicating motion to close the cut-off valve when the fulcrum pressure of the cylinder-lever on the bell-crank lever overcomes the resistances and causes the bell-crank lever to tilt.

4. In an automatic air-brake mechanism, a truck carrying a movable car-supporting bolster, brake mechanism supported by the truck, a bell-crank lever fulcrumed upon the truck, lever connections between said bolster and horizontal arm of the bell-crank lever to transmit the resistance of the weight of the load to the movement of said lever, a spring bearing on the vertical arm of the bell-crank lever and opposing an added resistance to the movement thereof, a cylinder-lever fulcrumed to the vertical arm of the bell-crank lever, a cut-off valve between the auxiliary reservoir and brake-cylinder of the brake mechanism, and means for communicating motion to close the cut-off valve under a prescribed movement of the bell-crank lever when the fulcrum pressure of the cylinder-lever on said bell-crank lever overcomes the resistances and causes the bell-crank lever to tilt, the valve being adapted to move to a further extent under a greater range of movement of the bell-crank lever to permit excess pressure in the cylinder to escape.

5. In an automatic air-brake mechanism, a truck carrying a movable car-supporting bolster, brake mechanism supported by the truck, a cut-off valve between the auxiliary reservoir and brake-cylinder of said mechanism, a bell-crank lever fulcrumed on the truck, load-sustaining levers supporting the bolster, transmitting-levers pivotally connected to the load-sustaining levers and horizontal arm of the bell-crank lever to transmit the resistance of the weight of the load to the movement of said lever, a spring bearing on the vertical arm of the bell-crank lever and opposing an added resistance to the movement thereof, a cylinder-lever fulcrumed to the bell-crank lever, and means for communicating motion to close the cut-off valve when the fulcrum pressure of the cylinder-lever on the bell-crank lever overcomes the resistances and causes the bell-crank lever to tilt.

6. In an automatic air-brake mechanism, a truck carrying a movable car-supporting bolster, brake mechanism supported by the truck, a pipe connection leading from the brake-cylinder and having branches leading to the triple valve and auxiliary reservoir, a test-valve controlling said branches, a cut-off valve between said test-valve and the brake-cylinder, a bell-crank lever fulcrumed upon the truck, lever connections between said bolster and horizontal arm of the bell-crank lever to transmit the resistance of the weight of the load to the movement of said lever, a spring bearing on the vertical arm of the bell-crank lever and opposing an added resistance to the movement thereof, a cylinder-lever fulcrumed to the vertical arm of the bell-crank lever, and means for communicating motion to close the cut-off valve when the fulcrum pressure of the cylinder-lever on the bell-crank lever overcomes the resistances and causes the bell-crank lever to tilt.

7. In an automatic air-brake system, means controlled by said system whereby the respective weights of the portions of the load sustained by each truck may be determined.

8. In an automatic air-brake system, means whereby the weight of the load is carried by brake-cylinder pressure, and means for determining by variations in such pressure the weight of the load.

9. An air-brake mechanism constructed and arranged for individually supporting portions of the load sustained by the respective trucks of a car by associated brake-cylinder pressures, and means for determining by variations in such pressures the weights of such individual portions of the load.

10. In an automatic air-brake system, means whereby the weight of the load is carried by the brake-cylinder pressure and balanced when the brakes are applied, means for determining by variations in such pressure the weight of the load, and means for preventing variations in the pressure after the brakes have been applied and the proper balancing pressure established.

11. In an automatic air-brake system, load-balancing devices, brake mechanism operatively connected with said devices, whereby the weight of the load is balanced by brake-cylinder pressure when the brakes are fully applied, means for determining through the brake-cylinder pressure the weight of the load and faulty action of the load-balancing devices, and means for establishing a greater or less resistance to the movement of the load-balancing devices to set the same to accurately balance the weight of the load as indicated by said weight-determining means.

12. In an automatic air-brake system, load-balancing devices, brake mechanism operatively connected with said devices, whereby the weight of the load is balanced by brake-cylinder pressure when the brakes are fully applied, a valve device controlled by the balancing devices for cutting off the flow of air from the auxiliary reservoir to the brake-cylinder when the load is balanced, a second valve for connecting the brake-cylinder directly with the auxiliary reservoir or indirectly therewith through the triple valve, means for determining through the brake-cylinder pressure the weight of the load and the balancing capacity of the load-balancing devices, and means for establishing a greater or less resistance to the movement of the load-balancing devices to set the same to accurately balance the weight of the load as indicated by said weight-determining means.

13. An air-brake system provided with means for applying a load resistance to braking pressure, said resistance being normally ineffective against the action of the brake-gear and rendered effective and balanced by brake-cylinder pressure when the brakes are fully applied, and means for preventing an augmentation of braking pressure in the event of an overbalancing of such resistance by the brake-cylinder pressure, said means being adapted to relieve the brake-cylinder of any excess pressure.

14. An air-brake system provided with means for applying a load resistance to braking pressure, said resistance being normally ineffective against the action of the brake-gear and rendered effective and balanced by brake-cylinder pressure when the brakes are fully applied, and a pressure-controlling valve operated by such means for cutting off the flow of air to the brake-cylinder when the pressure in the latter is more than sufficient to balance the load, said valve being adapted to permit of the escape of excess pressure in the cylinder when a considerable augmentation beyond a balancing pressure occurs.

15. In an automatic air-brake system, an auxiliary reservoir, a brake-cylinder, a pressure-regulating valve between said reservoir and cylinder, said valve having a cut-off and an exhaust position, devices for instituting a resistance to the movement of said valve equivalent to the weight of the mass to be braked, and a brake-lever movable independently of said devices and adapted to act thereon to balance the resistance when in full applying position, said devices being actuated by the lever under different degrees of abnormal movement thereof when the pressure in the brake-cylinder exceeds the maximum to adjust the valve to its cut-off and exhaust positions.

16. In an air-brake mechanism, a brake-cylinder, an auxiliary reservoir, a test-valve for connecting the brake-cylinder directly with the reservoir or indirectly therewith through the triple valve, a pressure-regulating valve between the test-valve and brake-cylinder, devices connected with said valve and adapted to oppose a resistance to the movement thereof equivalent to the weight resistance of the mass to be braked, and a brake-lever adapted in its full-brake-applying position to impart power to said devices equivalent to said resistance to balance the same, and upon an abnormal movement thereof to move said devices to actuate the regulating-valve.

17. In an air-brake mechanism, load-balancing means including a lever normally held from movement thereby, a brake-lever fulcrumed upon said lever and normally movable independently thereof and adapted to transmit an opposing power equal to the resistance thereto when the brakes are fully applied to balance such resistance, brake mechanism actuated by the brake-lever, and a pressure-regulating valve controlled by the resistance-lever to cut off the supply of air to the brake-cylinder when the pressure therein balances the resistance, said valve having an abnormal range of movement to allow air to exhaust from the brake-cylinder when the pressure therein materially overbalances the resistance.

18. In an air-brake system, the combination of an auxiliary reservoir, a brake-cylinder, a pressure-regulating valve between the reservoir and cylinder comprising a casing having a feed-passage and a by-pass, a regulating-valve controlling said passage, and a check-valve controlling the by-pass and normally held closed by auxiliary-reservoir pressure, load-resistance devices, and a connection between said devices and the regulating-valve, and a brake-lever adapted to impart motion to said devices when the brake-cylinder pressure overbalances the resistance.

19. In an automatic air-brake system, the combination of a truck having a movable bolster, load-balancing devices associated with the bolster, a spring mounted upon a stationary part of the truck and adjustable to vary its resistance to the movement of said load-balancing devices, a brake-lever operatively connected with the load-balancing devices to actuate the same when the weight of the load is overbalanced by brake-cylinder pressure, and pressure-controlling means operated upon the actuation of said load-balancing devices to prevent further augmentation of pressure in the brake-cylinder.

20. In an automatic air-brake system, load-balancing devices, brake mechanism associated therewith and operative to balance the weight of the load when the brakes are fully applied, and a pressure-controlling valve connected with the load-balancing devices and operated thereby to cut off the supply of air to the brake-cylinder when the pressure therein balances the weight of the load, said valve being further operative by the load-balancing devices to allow excess pressure to exhaust from said cylinder when the load-balancing devices are moved to an abnormal extent thereby.

21. In an automatic air-brake system, the combination of load-balancing devices, fluid-pressure brake mechanism associated therewith, means actuated by the load-balancing devices when the braking pressure balances the load to maintain a balancing pressure and prevent an augmentation of pressure, and means for adjusting the load-balancing devices for varying the balancing pressure.

22. In an automatic air-brake system, the combination with fluid-pressure brake mechanism including a brake cylinder and piston and an auxiliary reservoir, of load-balancing devices, brake-applying mechanism including a brake-lever connected with the load-balancing devices and operated by the brake-piston, a regulating-valve controlling the supply of air from the auxiliary reservoir to the brake-cylinder and governed in action by the load-balancing devices, and a second valve for directly and indirectly connecting the auxiliary reservoir with the brake-cylinder.

23. In an automatic air-brake system, the combination with fluid-pressure brake mechanism including a brake cylinder and piston and an auxiliary reservoir, of load-balancing devices, brake-applying mechanism including a brake-lever connected with the load-balancing devices and actuated by the brake-piston, a regulating-valve actuated by the load-balancing devices and controlling the supply of air from the auxiliary reservoir to the brake-cylinder, a valve for directly and indirectly connecting the auxiliary reservoir with the brake-cylinder, and means for adjusting the load-balancing devices for setting the brake mechanism for operation at varying balancing pressures.

24. In an automatic air-brake mechanism, the combination of a truck having a movable bolster, a system of load-balancing levers mounted on the truck and normally held from movement by the weight of the load on the bolster, brake mechanism connected with said levers and adapted to balance the resistance to movement thereof when the brakes are fully applied, whereby the levers will be moved against the load resistance when the latter is overcome by the braking pressure, and means actuated by such movement of the levers to control the feed of air to prevent an augmentation of braking pressure.

25. In an automatic air-brake system, the combination of a truck having a movable bolster, a system of load-balancing levers mounted on the truck and normally held from movement by the weight of the load on the bolster, an adjustable spring on the bolster operative upon one of said levers to increase the resistance to the movement thereof, brake mechanism connected with said levers and adapted to balance the resistance to movement thereof when the brakes are fully applied, whereby the levers will be moved against the load resistance when the latter is overcome by the braking pressure, and means actuated by such movement of the levers to control the feed of air to prevent an augmentation of braking pressure.

26. In an automatic air-brake mechanism, the combination of a truck having a movable bolster, load-supporting levers fulcrumed to the truck and carrying the bolster, a resistance-lever fulcrumed to the truck and connected to the supporting-levers, a resistance-spring adjustably mounted on the truck and acting on said resistance-lever, a brake-lever fulcrumed upon the resistance-lever, and a regulating-valve connected with the resistance-lever.

27. In combination with a car and its trucks, independent air-brake devices mounted upon each truck and each including a brake cylinder and piston, an auxiliary reservoir and a triple valve, and means sustained solely by the truck and associated with each set of brake devices for establishing a resistance to the action of the brake-piston equivalent to the weight of the car and load, each set of devices thus being supported *in toto* by its truck and independently governable through the action of its own triple valve, whereby, in the event of the brake mechanism on either truck becoming disabled, the other may operate to apply its braking pressure to control the car.

28. In combination with a car and its trucks, independent air-brake devices mounted upon each truck and each including a brake cylinder and piston, an auxiliary reservoir and a triple valve, means restrained solely by the truck and associated with each set of brake devices for establishing a resistance to the action of the brake-piston equivalent to the weight of the car and load, and coacting means for establishing an added resistance equivalent to the weight of the truck, each set of devices thus being supported *in toto* by its truck and independently governable through the action of its own triple valve, whereby, in the event of the brake mechanism on either truck becoming disabled, the other may operate to apply its braking pressure to control the car.

29. In an air-brake system, the combination of a truck having stationary and movable bolsters, load-sustaining levers fulcrumed to the stationary bolster and supporting the movable bolster, load-transmitting levers connected with said load-sustaining levers, a bell-crank resistance-lever having one of its arms connected with the load-transmitting levers, an adjustable spring mounted on the stationary bolster and bearing on the vertical arm of the resistance-lever, a brake-lever fulcrumed to the vertical arm of the resistance-lever, a pressure-regulating valve in the supply connection between the auxiliary reservoir and brake-cylinder, and connecting means for operating said valve when the resistance-lever is moved.

In testimony whereof I affix my signature in presence of two witnesses.

WILLIAM McCOOK.

Witnesses:
JOHN L. FLETCHER,
C. C. HINES.